United States Patent [19]

Paulson

[11] 4,392,528
[45] Jul. 12, 1983

[54] SWABBING CUP CONSTRUCTION FOR SWABBING AN OIL WELL PIPE

[76] Inventor: Robert C. Paulson, 2110 E. Shawnee Ave., Muskogee, Okla. 74401

[21] Appl. No.: 328,011

[22] Filed: Dec. 7, 1981

[51] Int. Cl.³ .................. E21B 37/10; E21B 43/18
[52] U.S. Cl. .................. 166/153; 166/177; 166/369; 417/555 A; 92/255
[58] Field of Search ............... 166/105, 170, 173, 175, 166/176, 153, 154, 155, 156, 202, 177; 277/212 C, 116.4, 116.8, 125; 15/104.16, 104.12, 104.18, 104.19, 104.06 R; 92/205, 207, 255, 259; 417/555 A

[56] References Cited

U.S. PATENT DOCUMENTS

| | | | |
|---|---|---|---|
| 2,135,167 | 11/1938 | Campbell | 417/555 A |
| 2,221,775 | 11/1940 | Boynton | 166/20 |
| 2,290,774 | 7/1942 | Skinner et al. | 417/555 A |
| 2,988,148 | 6/1961 | Conrad et al. | 277/116.4 X |
| 3,989,106 | 11/1976 | Taylor | 166/202 X |

FOREIGN PATENT DOCUMENTS 777592 2/1968 Canada ........................ 166/56

Primary Examiner—Stephen J. Novosad
Assistant Examiner—Joseph Falk
Attorney, Agent, or Firm—Edward L. Benno

[57] ABSTRACT

An improved swabbing cup construction for use on the mandrel of a swabbing tool for clearing liquids and particulate matter, and initiating the flow of oil, from an oil well pipe. The improved cup construction is manually adjustable on the mandrel to compensate for wear of the cup to greatly increase the life of the cup and to substantially facilitate the swabbing procedure for an oil well pipe. The method comprises the steps of observing the wear of the swabbing cup and of manually increasing the outer diameter of the swabbing cup while it is on the mandrel and during swabbing operations of said oil well pipe.

9 Claims, 8 Drawing Figures

SWABBING CUP CONSTRUCTION FOR SWABBING AN OIL WELL PIPE

BACKGROUND OF THE INVENTION

Oil well swabbing procedures known in the art primarily involve the initiation of the flow of oil from a new well. After a well has been drilled through oil bearing sands, a pipe or casing is placed in the drilled hole and the lower portion of the pipe is cemented in place by pumping a certain amount of cement down the pipe, out of the bottom, and up along the outside of the pipe through the region of the oil bearing sands. After the cement is in place, a rubber plug is pumped down the pipe to clear the cement from the inside of the pipe, and the plug remains at the bottom immersed in cement. When the cement has set, holes are shot at right angles to the pipe into the oil bearing sand zone. Generally, because the oil sand zone is of a porous nature, the sands have absorbed some of the cement and partially sealed the area. Hydrochloric acid followed by salt water is then pumped down the pipe to open the area, and the swabbing tool and procedure is then used to remove the acid, salt water and any sand in the pipe, and to create a partial vacuum in the oil sands area in an attempt to start the flow of oil from the oil sands formation.

The swabbing tool comprises a mandrel which is a pipe generally about six feet long with a stop or cup retainer on each end thereof. Generally, four swabbing cups are slidably mounted on the mandrel, and the mandrel is lowered and raised in the oil well pipe by a cable controlled by a winch. An operator of the winch lowers the mandrel and the swabbing cups carried thereon to the bottom of the oil well pipe below the acid, salt water and sand in the pipe and then raises the mandrel and cups to carry the liquids and sand thereabove to the surface of the ground for disposal. As the mandrel is raised, a partial vacuum is created in the oil well pipe below the mandrel which tends to draw oil from the oil sands formation. That procedure is repeated many times until the well starts to flow or is swabbed dry of all liquids.

The prior art swabbing cups consist of an annular rubber member having an outer diameter initially substantially equal to the inner diameter of the oil well pipe and are shaped so that the rubber will flex toward the mandrel as it is lowered through the liquids in the oil well pipe and will flex outwardly against the oil well pipe under the weight of the column of liquids thereabove as it is raised in the oil well pipe. The necessary repeated lowering and raising of the mandrel and cups causes relatively rapid wear of the periphery of the cup with the consequent loss of its ability to raise a column of liquid and to create the necessary partial vacuum. Disassembly of the mandrel to remove and replace worn cups is a relatively expensive procedure including the time lost during the down time of the equipment while the cups are being replaced.

The subject invention comprises a swabbing cup construction which is easily manually adjustable for wear in use, and a method which greatly increases the efficiency and reduces the cost of oil well pipe swabbing operations.

SUMMARY OF THE INVENTION

The primary object of the present invention is to substantially increase the efficiency of oil well pipe swabbing procedures and to substantially reduce the cost of such procedures.

The foregoing is accomplished by an improved swabbing cup construction which is manually adjustable to greatly increase the life of such cups, and by an improved swabbing procedure which enables a person to repeatedly quickly manually adjust the size of the swabbing cups while on the swabbing cup mandrel and during the swabbing procedure to minimize down time of the swabbing rig and to maximize the operating efficiency of the swabbing procedure.

The improved swabbing cup of the invention comprises two parts. The first part is a rigid, such as steel, cylindrical member with an elastomeric, such as rubber, member securely molded about only one axial portion of the rigid member. The remaining axial portion of the rigid member is provided with external threads. The elastomeric member is annular in shape with leading and trailing surfaces formed as the surfaces of frustrums and extending radially outwardly and axially in a direction toward the threaded end of the rigid member. The elastomeric member has an initial outer diameter substantially equal to the inner diameter of the oil well pipe to be swabbed. The second part is a rigid annular member or ring having internal threads complimentary to the threads on the rigid member. The ring has an outer diameter substantially less than the outer diameter of the elastomeric member and is threaded on the rigid member with the leading surface of the ring against the trailing surface of the elastomeric member. The leading surface of the ring is shaped as the surface of a frustrum. Relative to the axis of the ring and the elastomeric member, the angle of any radially extending line on the leading surface of the ring is greater than the angle of any radially extending line on the trailing surface of the elastomeric member. That angular difference enables the ring in being threaded on the rigid member toward the elastomeric member to flex the elastomeric member radially outwardly to compensate for wear of the elastomeric member in use.

In a preferred embodiment of the invention the leading surface of the ring is provided with radially extending teeth or projections which will indent the trailing surface of the elastomeric member and interlock the ring therewith to hold the ring in any threaded position, but which will not cause the radially outward edge of the elastomeric member to be bent out of a circle.

In another preferred embodiment, the trailing surface of the ring is provided with hand-engageable projections which enable a person to hand tighten the ring against the elastomeric member, and with spanner wrench-engageable holes which enable a person to tighten the ring against the elastomeric member with a spanner wrench.

In other embodiments the trailing surface of the ring is provided with circumferentially extending sand-catching grooves from which sand accumulations may be wiped. Also, the outer periphery of the ring may be formed as a short cylindrical section and that section provided with a radially inwardly extending circumferentially directed sand-catching groove from which sand accumulations may be wiped.

Using a swabbing cup such as described above a person may perform the method of the invention. In its basic embodiment that method comprises the steps of dropping a mandrel, with a swabbing cup thereon of an initial outer diameter substantially equal to the inner diameter of the oil well pipe to be swabbed, into the oil well pipe, then raising the mandrel from the pipe to swab a quantity of liquids therefrom, then repeating those steps and in addition observing the amount of wear of the outer periphery of the cup and when substantial wear has been observed to increase the outer diameter of the cup while the cup is on the mandrel to again bring the outer diameter of the cup to the inner diameter of the oil well pipe, and then continuing the steps of dropping and raising the mandrel in the oil well pipe to continue swabbing liquids from the pipe. Although the method has been described as swabbing liquids from the pipe it should be understood that an additional important function of the swabbing procedure is to draw a partial vacuum in the pipe below the mandrel in an attempt to start the flow of oil in the well. Those skilled in this art will appreciate the increased efficiency of the swabbing method described with an attendant substantial reduction in down times of the equipment resulting from the use of prior art procedures.

Other objects and features of the invention will be apparent upon a perusal of the hereinafter following detailed description read in conjunction with the drawings.

DETAILED DESCRIPTION OF THE INVENTION

Figure 1:
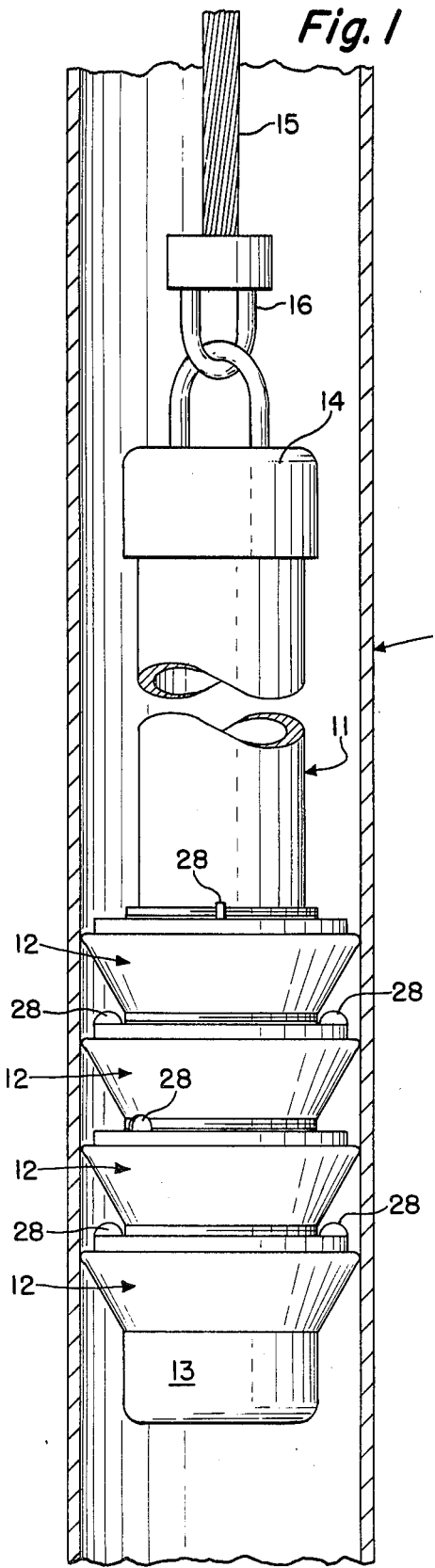
FIG. 1 is a vertical cross sectional view of an oil well pipe showing a swabbing tool therein with the cups of the invention thereon.

FIG. 1 shows how the cup constructions of the invention are associated with a swabbing tool and how the swabbing tool is associated with an oil well pipe. The oil well pipe or casing 10 is commonly a four inch diameter steel pipe.

The swabbing tool comprises a mandrel 11 and a plurality of swabbing cups 12. The mandrel 11 preferably is a steel pipe about six feet long and is provided with a stop 13 at the lower end and a stop and hanger 14 at the upper end thereof. The mandrel 11 is supported by a cable 15 having a clevis connection 16 with the stop and hanger 14 of the mandrel 11.

Figure 2:
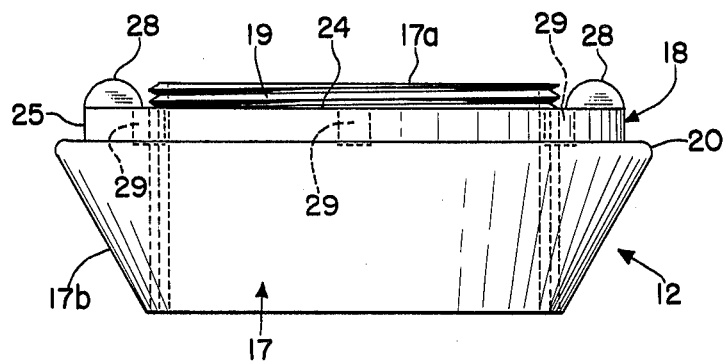
FIG. 2 is an enlarged side elevational view of one embodiment of a swabbing cup constructed according to the invention.
Figure 3:
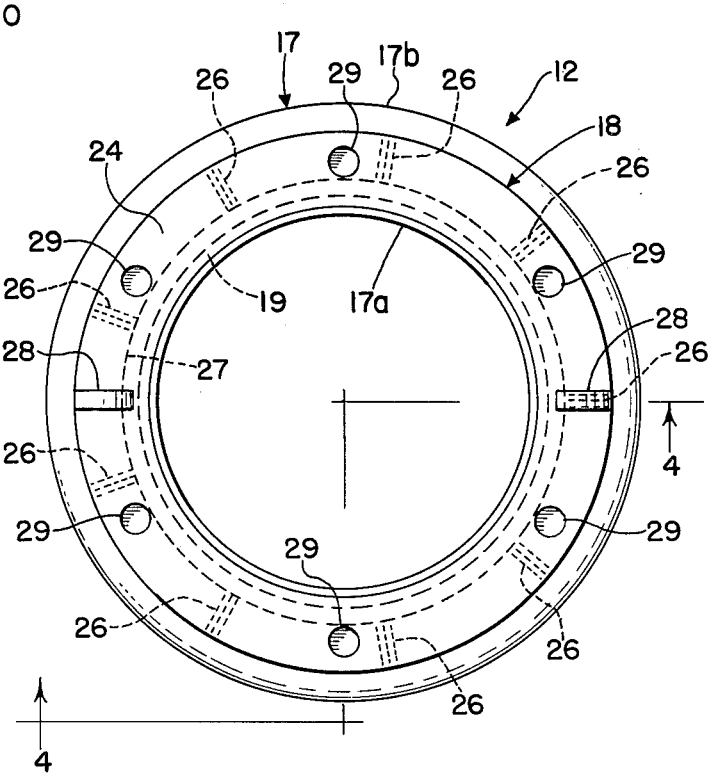
FIG. 3 is a top plan view of the structure of FIG. 2.
Figure 4:
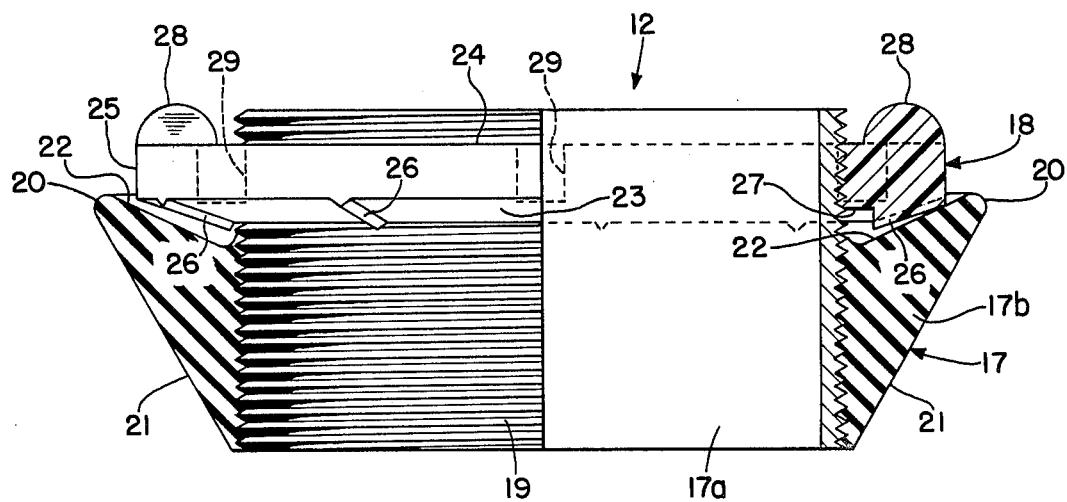
FIG. 4 is an enlarged partially cross sectional view of the cup of FIGS. 2 and 3 and taken substantially along the line 4—4 of FIG. 3.

The four swabbing cups 12 shown in FIG. 1 are slidably mounted on the mandrel 11 between the stops 13 and 14. FIGS. 2-4 show the detailed construction of a cup 12 in a first embodiment of the invention. The cup 12 comprises two parts 17 and 18.

Part 17 comprises a rigid member 17a and an elastomeric member 17b. The rigid member 17a is made as a cylindrical member of a material such as steel. The inner diameter of the member 17a is substantially equal or slightly greater than the outer diameter of the mandrel 11 so that the member 17a can be slidably mounted on the mandrel 11 with a relatively close fit when one of the stops 13 or 14 are removed. The outer surface of the member 17a is threaded with threads 19, and the elastomeric member 17b is molded about a substantial axial portion of the outer surface of the member 17a as may be seen in FIG. 4. The member 17b may be formed from a material such as rubber or a plastics material having good resiliency, wear qualities and resistance to hydrocarbons and acids. It should be understood that although the entire outer surface of the member 17a is threaded in the embodiment shown, the invention contemplates that other surface shapes may be used to effectively lock the elastomeric member 17b on the member 17a. The elastomeric member 17b is further shaped to have a circular outer periphery 20 which is of an initial diameter substantially equal to the inner diameter of the oil well pipe 10 with a leading surface 21 and a trailing surface 22 extending between the outer surface of the member 17a and the periphery 20 as shown in FIG. 4. The surfaces 21 and 22 are shaped as the surface of a frustrum, and both surfaces 21 and 22 extend radially outwardly and axially toward the exposed threaded end of the member 17a. That shape permits limited flexing of the elastomeric member 17b toward mandrel 11 when the swabbing tool is dropped down a well pipe 10 through liquids therein, and limited flexing of the elastomeric member 17b radially outwardly against the inner wall of the well pipe 10 as the swabbing tool is raised with a column of liquids thereabove.

The part 18 is rigid and ring shaped, and the inner surface is threaded with threads complimentary to threads 19 on the part 17 as may be seen in FIG. 4. The part 18 may be molded from a relatively rigid suitable plastics material. The part 18 has a leading surface 23, a trailing surface 24, and an outer peripheral surface 25. The leading surface 23 is shaped as the surface of a frustrum and is provided with a plurality of teeth 26. The teeth 26 are radially directed and circumferentially spaced apart about the leading surface 23. Relative to the axis of the parts 17 and 18, the angle between any radially extending line on the surface of the leading surface 23 and the axis is greater than the angle between any radially extending line on the trailing surface 22 of the part 17 and the axis. That angular difference may be seen in the cross sections of FIG. 4 and provides for a relatively large range of threaded movement of the part 18 during contact with the part 17 to provide for a maximum range of increasing diameters of the part 17 to compensate for wear of the periphery 20 of the part 17 in use in a swabbing procedure in an oil well pipe. As the part 18 is threaded against the part 17, the leading surface 23 of the part 18 engages the trailing surface 22 of the part 17 and the teeth 26 indent the trailing surface 22 to effectively interlock the part 18 and the part 17 against accidental relative unthreading movements of those parts. The leading surface 23 is relieved, as at 27 in FIG. 4, in the radially inward circumferential portion thereof to prevent interference between the leading surface 23 and the trailing surface 23 which would limit the range of spreading action of the part 18 against the part 17.

In the embodiment of FIGS. 2-4, the trailing surface 24 of the part 18 is substantially flat in a plane perpendicular to the axis of the part, and is provided with a plurality of hand-engageable projections 28 and spanner wrench-engageable holes 29. The projections 28 enable a person to manually thread the part 18 against the part 17 while holding the part 17 and while the swabbing cup is on the mandrel 11 as may be seen in FIG. 1. The spanner wrench holes 29 enable a person to use a spanner wrench to increase the outer diameter of swabbing cup 12 while it is on the mandrel 11.

The outer peripheral surface 25 is an uninterrupted cylindrical surface, and the diameter of the part 18 is substantially less than the initial outer dimeter of the part 17 to avoid contact between the inner surface of the well pipe 10 and the surface 25 of the part 18 during use of cup 12 on a swabbing tool.

Figure 5:
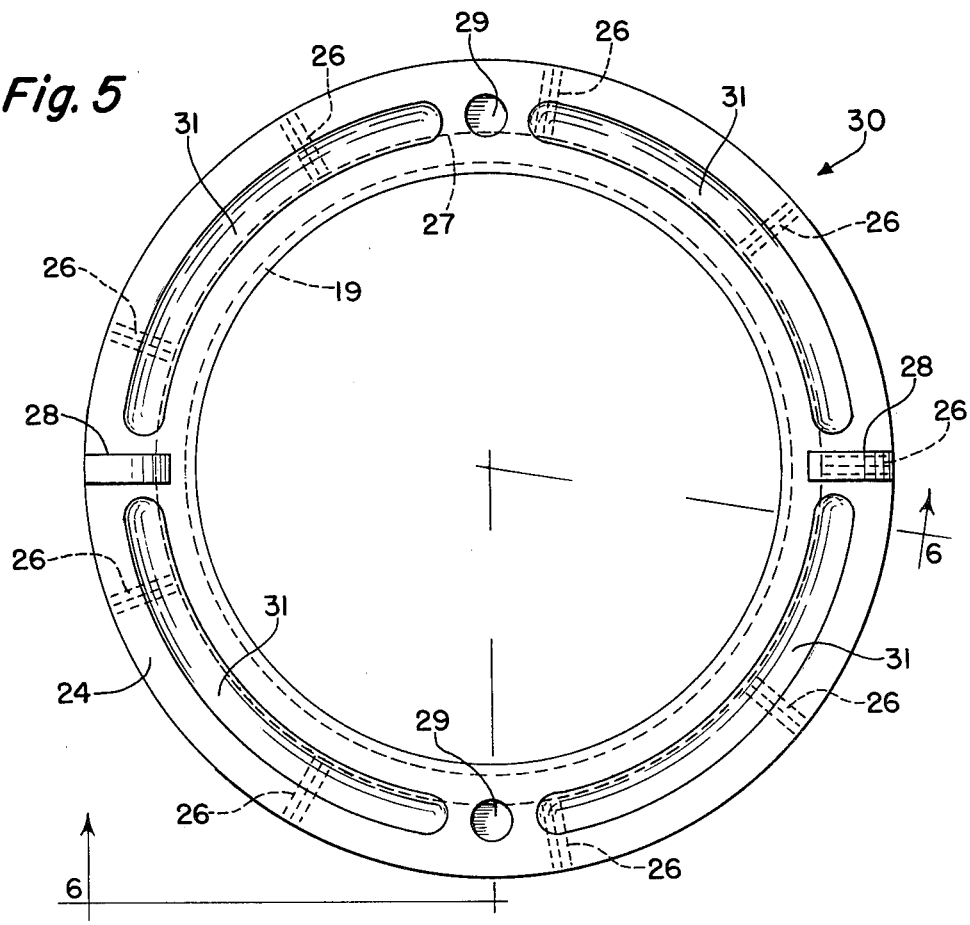
FIG. 5 is a top plan view of another embodiment of the ring member of the invention.
Figure 6:
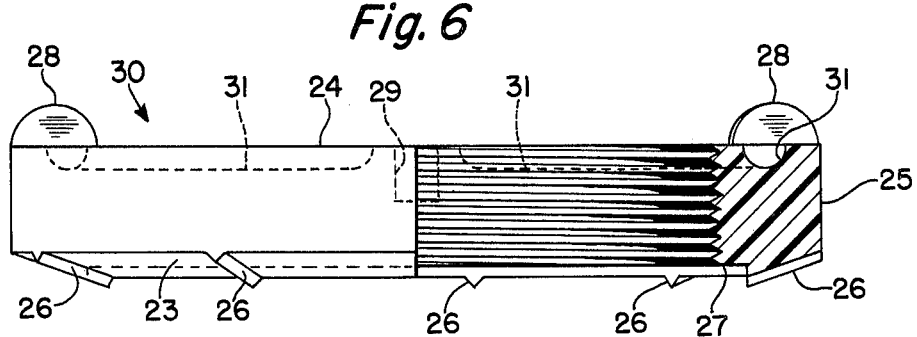
FIG. 6 is a partially cross sectional view of the structure of FIG. 5 and taken substantially along the line 6—6 of FIG. 5.

The embodiment of FIGS. 5 and 6 shows a modified adjusting ring 30 that may be used in place of the part 18 of the first embodiment. Elements of the ring 30 that are the same as those of the part 18 are identified with the same numbers. The embodiment of FIGS. 5 and 6 differs from the first embodiment in that the spanner wrench holes 29 are merely two in number, and the trailing surface 24 of the ring 30 is provided with a plurality of sand-catching grooves 31. The sand-catching grooves 31 are elongated grooves extending circumferentially about the surface 24 between the projections 28 and the holes 29. When in use in a swabbing procedure, the grooves 31 will catch or receive deposits of sand entrained in the liquids which are removed from the well pipe.

Figure 7:
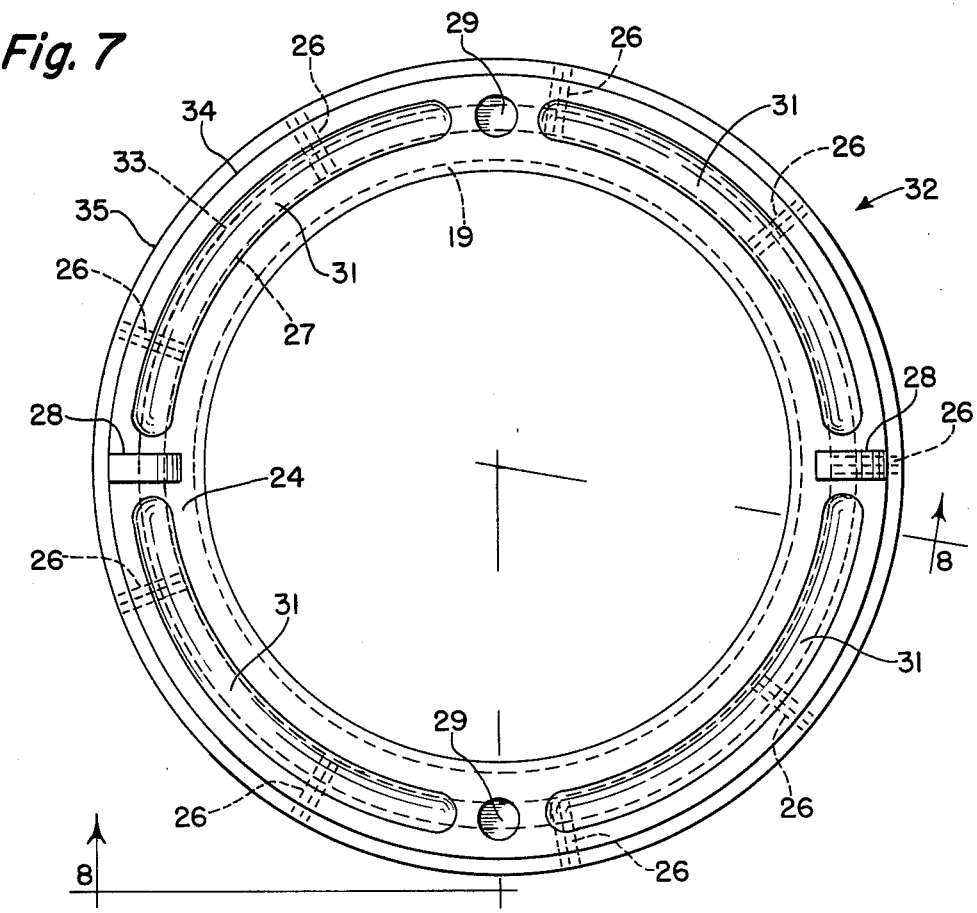
FIG. 7 is a top plan view of another embodiment of the ring member of the invention.
Figure 8:
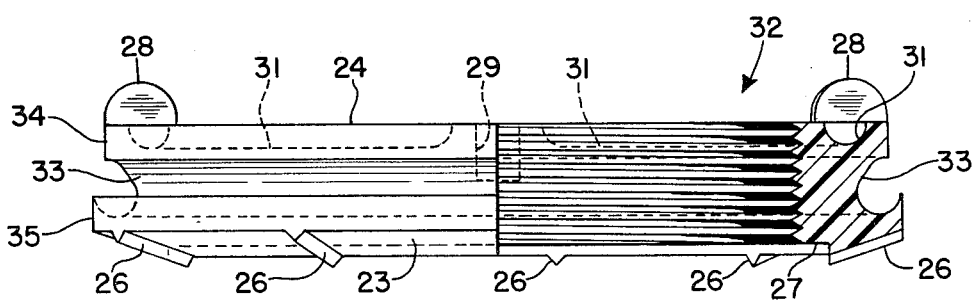
FIG. 8 is a partially cross sectional view of the structure of FIG. 7 and taken substantially along the line 8—8 of FIG. 7.

The embodiment of FIGS. 7 and 8 shows a further modified ring 32 which may be in place of the part 18 of the first embodiment. Elements of the ring 32 that are the same as those of the part 18 are identified with the same number. The embodiment of FIGS. 7 and 8 is the same as that of FIGS. 5 and 6 in having sand-catching grooves 31 in the trailing surface 24. The embodiment of FIGS. 7 and 8 differs from the other embodiments in having a sand-catching groove 33 between the peripheral surfaces 34 and 35. The peripheral surface 34 has a slightly smaller diameter than the diameter of the peripheral surface 35 and the sand-catching groove 33 extends circumferentially about ring 32 between the peripheral surfaces 34 and 35. When the ring 32 is threaded on a part 17 to make a swabbing cup and used on a mandrel 11 in a swabbing procedure in an oil well pipe 10, the groove 33 in addition to the grooves 31 will catch or receive sand or similar particulate matter which are entrained in the liquids which are removed from the oil well pipe.

A plurality of swabbing cups made according to one or more of the above described embodiments enables one to practice a unique swabbing procedure or method of substantially increased efficiency and economies over prior known procedures. During swabbing operations in an oil well pipe, the wear of the outer periphery of the swabbing cups is observed as the swabbing tool is drawn from the well pipe at the end of a cycle of operation. The observation of wear may be directly upon the swabbing cups or indirectly by the amount of liquids raised from the well. When substantial wear is observed, the operator manually adjusts the outer diameter of the part 17 of each cup 12 while the cups are on the mandrel 11 and the swabbing tool is at the upper end of a swabbing cycle. The operator then again lowers the swabbing tool into the well pipe to begin another cycle of swabbing.

Having described the invention, it is to be understood that changes can be made by a person skilled in the art within the spirit and scope of the claims.

I claim:

1. In an oil well swabbing tool for raising a mixture of liquids and particulate matter such as sand from an oil well pipe in which said tool comprises a cylindrical mandrel, a swabbing cup construction for mounting on said mandrel, said cup construction comprising first and second elements adjustably secured together, said first element comprising a rigid cylindrical member having an internal diameter substantially equal to the outer diameter of said mandrel for slidably mounting said cylindrical member on said mandrel, said first element further comprising an elastomeric material annular member molded circumferentially about one end portion of said cylindrical member, at least the other end portion of said cylindrical member being externally threaded, said annular member having leading and trailing surfaces extending radially outwardly and axially toward said other end portion of said cylindrical member, said trailing surface of said annular member further having the shape of the surface of a frustrum, the maximum diameter of said annular member being substantially equal to the inner diameter of said oil well pipe, said second element comprising a substantially rigid ring member internally threaded with threads complimentary to the threads on said other end portion of said cylindrical member, said ring member having radially extending leading and trailing surfaces, said leading surface of said ring member further extending in an axial direction toward said trailing surface thereof and being generally shaped as the surface of a frustrum, the maximum diameter of said ring member being substantially less than the maximum diameter of said annular member, said ring member being threaded on said other end portion of said cylindrical member with said leading surface of said ring member directed toward surface engagement with said trailing surface of said annular member, and the surface of a frustrum shape of said leading surface of said ring member relative to the surface of a frustrum shape of said trailing surface of said annular member providing increasing radial expansion of said annular member upon progressively greater threading movement of said ring member on said cylindrical member toward and against said annular member.

2. In a swabbing cup construction as defined in claim 1, and a plurality of tooth formations on said leading surface of said ring member, said tooth formations being aligned in a radially extending direction and being shaped to substantially indent and interlock with said trailing surface of said annular member to substantially prevent an unthreading movement of said ring member from said annular member during use of said tool in an oil well pipe.

3. In a swabbing cup construction as defined in claim 2, and hand engageable projections on said trailing surface of said ring member for facilitating hand tightening by threading of said ring member against said annular member.

4. In a swabbing cup construction as defined in claim 2, and a plurality of spanner wrench receiving sockets in said trailing surface of said ring member for facilitating spanner wrench tightening by threading of said ring member against said annular member.

5. In a swabbing cup construction as defined in claim 2, and particulate matter trapping grooves formed in said trailing surface of said ring member.

6. In a swabbing cup construction as defined in claim 5, the radially outward peripheries of said leading and trailing surfaces of said ring member being separated in an axial direction by a cylindrical surface, and a radially inwardly directed particulate matter receiving groove formed in said cylindrical surface of said ring member.

7. In an oil well swabbing tool for raising a mixture of liquids and particulate matter such as sand from an oil well pipe and for drawing a partial vacuum in said pipe below said tool, said tool comprising an elongated cylindrical mandrel having a cable connection at the upper end thereof and at least one swabbing cup construction, said swabbing cup construction comprising a first part and a second part carried on said first part, said first part comprising a rigid cylindrical member slidably mounted on said mandrel for limited sliding movement thereon below said cable connection, said cylindrical member being externally threaded, said first part further comprising an annular member of an elastomeric material molded about a substantial axial extent of said cylindrical member at the lower portion thereof, said annular member comprising leading and trailing surfaces shaped as the surface of frustrums, said leading and trailing surfaces of said annular member directed radially outwardly and axially upwardly of said cylindrical member and terminating in an outer peripheral portion of an initial diameter substantially equal to the inner diameter of said oil well pipe, said second part comprising a rigid ring having internal threads complimentary to said externally threaded cylindrical member and a leading surface shaped as the surface of a frustrum, said second part being threaded on said cylindrical member with said leading surface of said second part directed toward said trailing surface of said annular member, relative to the axis of said first and second parts any radially extending line on said leading surface of said second part being disposed at a greater acute angle than any radially extending line on said trailing surface of said annular member, and the outer diameter of said ring being less than any diameter of said peripheral portion of said annular member.

8. In an oil well swabbing tool as defined in claim 7, and means on said leading surface of said ring for releaseably holding said ring and said annular member together in a threaded condition of said ring against said annular member.

9. In an oil well swabbing tool as defined in claim 7, and sand-catching grooves formed in said ring.

* * * * *